2,893,925

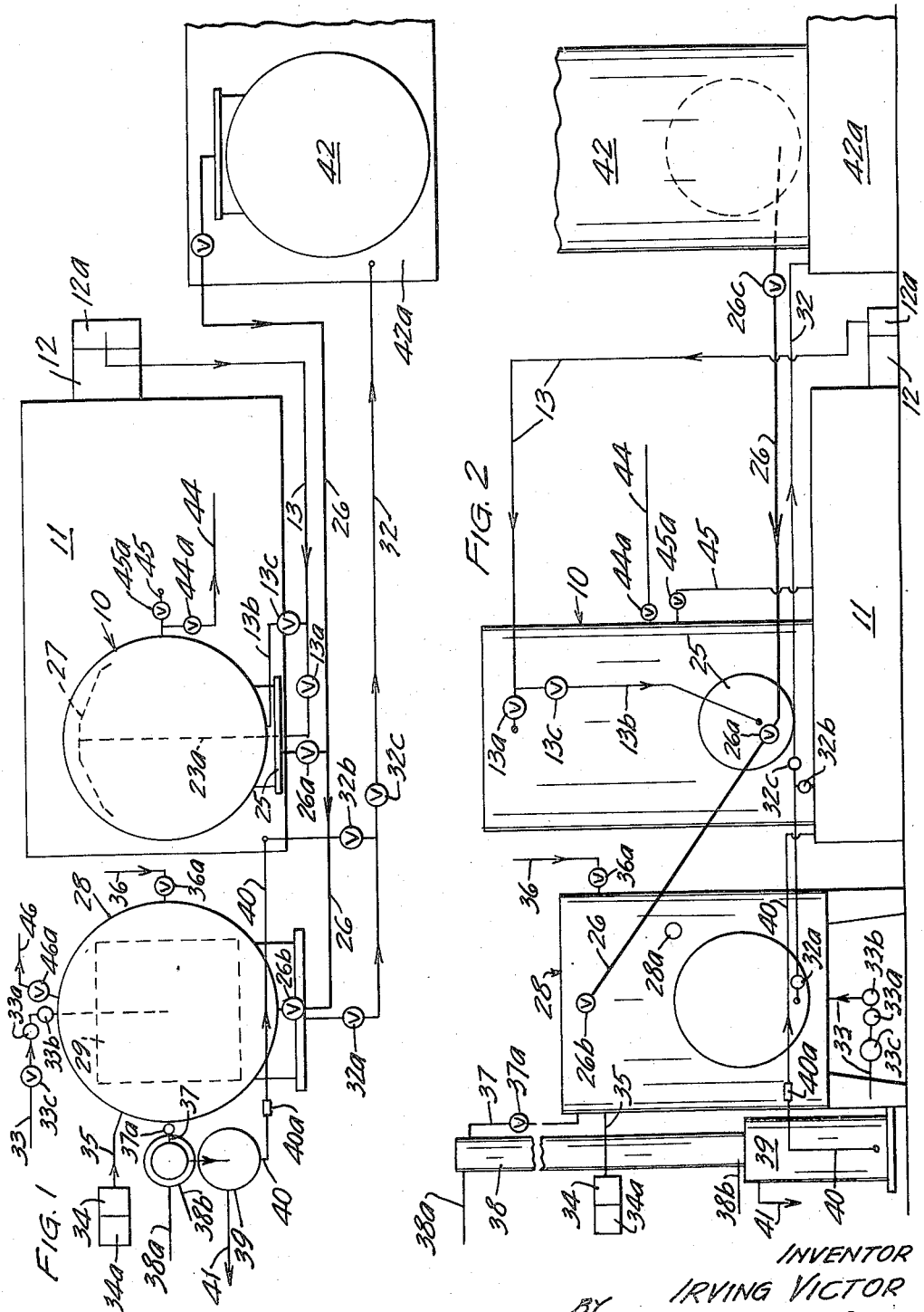

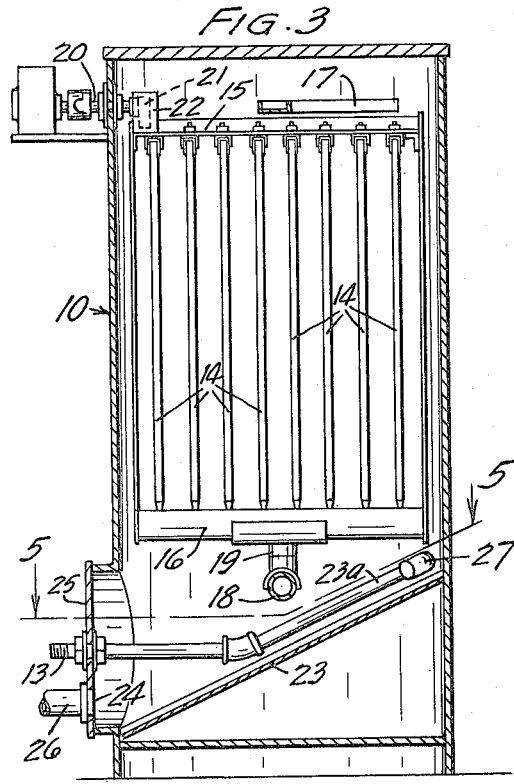
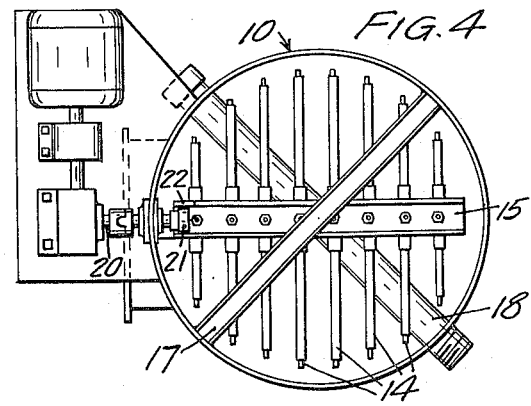
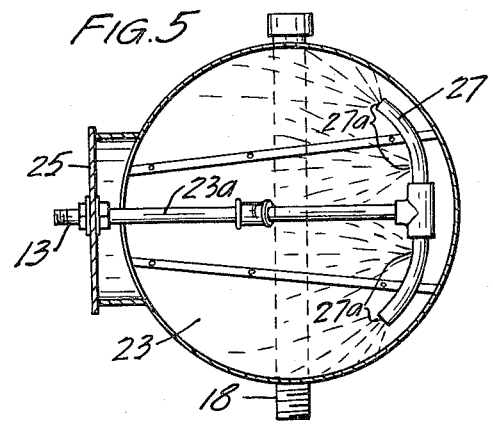
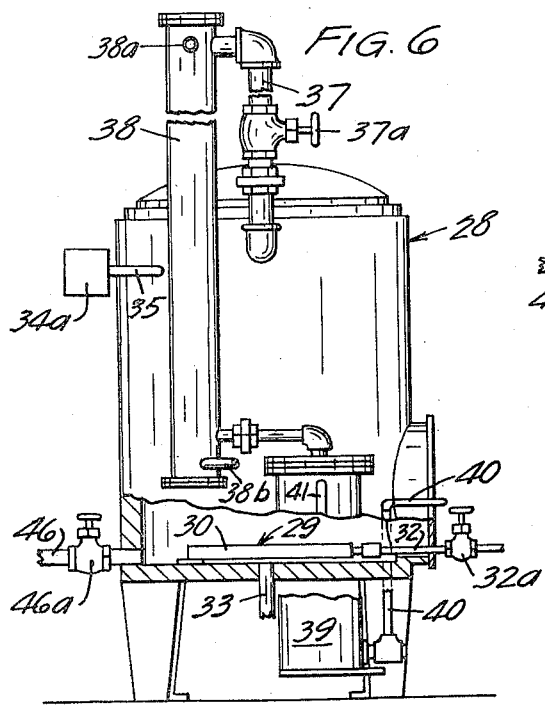
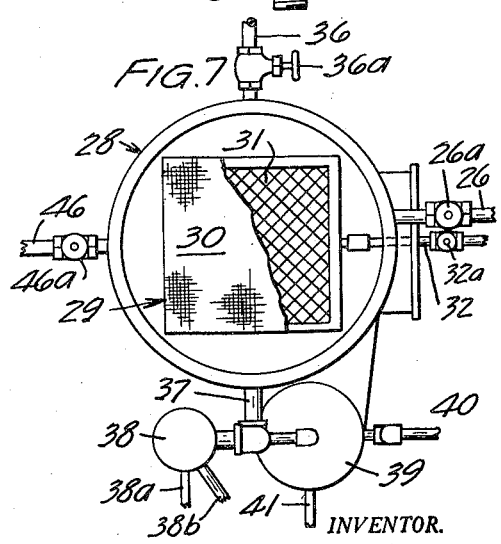
INVENTOR.
IRVING VICTOR
BY
Whiteley and Caine
ATTORNEYS United States Patent Office 2,893,925
Patented July 7, 1959

METHOD AND APPARATUS FOR RECLAIMING SOLVENT FROM A CLEANSING WASH

Irving Victor, Minneapolis, Minn., assignor, by direct and mesne assignments, of one-half to Vic Manufacturing Company, Minneapolis, Minn., a corporation of Minnesota, and one-half to Butler Manufacturing Company, Kansas City, Mo., a corporation of Missouri Application April 19, 1957, Serial No. 653,904

11 Claims. (Cl. 202—46)

This invention relates to a method and apparatus for reclaiming solvent from a cleansing wash containing solvent and impurities in the form of dirt and soil.

In the dry cleaning of garments and other fabrics with solvents, the solvent in performing its normal operation removes soil in various forms from the fabric, and since the solvent is subsequently recirculated the soil must be removed from the solvent to prevent its being subsequently redeposited on other fabrics. It is a general practice in the industry to filter the solvent after use, and because the cleansing solution will contain various forms of impurities, it is customary to use a filtering powder, such as kieselguhr or diatomaceous earth as a filtering aid, as this material tends to form a spongy porous surface on a filter leaf and prevent gummy substances from clogging the pores of the filter cloths. After extensive use, the filtering aid will have collected a substantial amount of soil forming a black gummy substance referred to as filter muck. The muck contains considerable amount of solvent. In most dry cleaning operations, chlorinated hydrocarbons are used, such as tri-chlorethylene and per-chlorethylene, and these solvents are quite expensive. It is a current practice to recover the solvent from the muck by steam distillation, conducted in a recovery apparatus in the nature of a still. The present practice is to manually remove the muck in the form of a sludge out of the filtering or recovering apparatus and transport it in open communication with the atmosphere to the recovery still. After distillation, the residue is manually removed from the still and dumped. This practice is undesirable, because of labor costs and also because the solvents in the muck are highly volatile, and exposing the muck to the air in a dry cleaning plant produces an extremely disagreeable odor, and in sufficient concentration may be harmful to the health of the operators.

In the present invention, it is proposed to separate the impurities from the cleansing wash until a substantial quantity of the impurities have accumulated, and then instead of the costly and time consuming operations of manually removing the muck and exposing it to the atmosphere where the solvent will contaminate the surrounding atmosphere, to retain the muck within the separating apparatus and add solvent thereto to form a slurry which may be pumped to the recovery apparatus. Within the recovery apparatus, the liquid solvent is then separated from the muck or impurities prior to the steam distilling operation. This procedure materially reduces labor costs and eliminates contamination of the atmosphere within the working space.

It is an object of this invention to provide a novel and highly efficient method and apparatus for reclaiming muck collected in the separation of a solvent cleansing wash.

Another object is to provide a method of handling filter muck by forming the same into a slurry, then transferring the slurry from the separating apparatus to the reclaiming apparatus out of contact with the surrounding atmosphere, and again separating the solvent from the slurry within the latter apparatus prior to distillation.

Another object is to provide a substantially closed system for recovering solvent from the cleansing wash by the use of a liquid transfer system, thereby elminating loss of solvent by evaporation to atmosphere and further utilizing a liquid transfer system to dispose of the ultimate residue.

A further object is to provide a system, including an enclosed filter by which impurities may be removed from a solvent wash, and in which the residual material may be combined with some of the unseparated wash to form a slurry that may be pumped to another portion of the system without exposure to atmosphere, and within the latter portion of the system, the liquid portion of the slurry recovered, after which the residual solvent is removed by distillation and the ultimate residue disposed of in a fluid form where permissible.

These and other objects and advantages of my invention will more fully appear from the following description made in connection with the accompanying drawings wherein like reference characters refer to the same or similar parts throughout the several views, and in which:

Fig. 1 is a top plan view showing my new system;

Fig. 2 is a side elevational view thereof;

Fig. 3 is a vertical sectional view of the filter shown in Figs. 1 and 2;

Fig. 4 is a top plan view of said filter with the cover removed;

Fig. 5 is a transverse sectional view taken substantially along the line 5—5 of Fig. 3;

Fig. 6 is a side elevational view of the solvent reclaimer with parts thereof broken away; and Fig. 7 is a top plan view of the muck reclaimer shown in Fig. 6 with the cover thereof removed.

Referring now to the accompanying drawings is disclosed one form of apparatus by which the process may be conducted. Rereference character 10 indicates a filter chamber, which as disclosed in Fig. 2, is supported above a reservoir 11 that forms a storage for the unfiltered wash adapted to be separated by said filter. Reference character 12 designates a pump provided with a driving motor 12a that is intended to deliver the unfiltered wash from reservoir 11 to a supply line 13 into the upper portion of the filter chamber 10. A valve 13a is provided in the conduit 13 to control the flow of fluid therethrough. As best seen in Fig. 3, within the interior of the casing 10, is a filter arrangement generally disclosed in Patent No. 2,480,320, which is assigned to the assignee of this application. The filter 10 consists of a plurality of hollow filter leaves 14 connected between a pair of supporting members 15 and 16. The upper support 15 is pivotally supported from the top of the filter casing by a cross member 17, and the lower supporting member 16 is pivotally supported on a cross tube 18. Each of the filter elements 14 supports a porous filter bag, not shown, that forms a porous diaphragm to separate impurities and allow the filtrate to flow to the frame 14 and thence through the supporting member 16 to a connection 19 into the cross pipe 18. In order to periodically free the surfaces of the filter leaves from the solid material or residue collected thereon, the filter elements 14 may be oscillated by a rotary shaft 20, having an eccentric 21 fixed thereto with a suitable fork 22 fixed to the upper filter support member 16. The oscillation of eccentric 21 produces a shaking action of the filter elements to shake the residual accumulation or muck therefrom. Within the interior of the casing and beneath the filter elements so as to receive the muck, is a sloping bottom panel 23 whose lower extremity extends to an outlet opening 24 formed in the lower portion of a cleanout door 25.

As best seen in Fig. 2, a branch conduit 13b containing a control valve 13c extends from conduit 13 to a washout line 23a that extends within the interior of the filter tank 10 across the upper surface of plate 23 to a curved manifold 27 that is provided with a multiplicity of apertures or jets 27a directed downwardly across the inclined plate 23. The discharge from these jets produces a lateral flow across the inclined plate 23. Under normal operating conditions, the filter chamber 10 will be constantly filled with the wash liquid under pressure produced by pump 12, and the pressure of the liquid coming from the spray jets 27a will produce turbulence within the lower portion of the liquid so as to agitate any muck that has settled on plate 23, and will thus tend to wash the muck in the direction of the discharge conduit 26.

General reference numeral 28 discloses a muck cooker in the form of a still or a closed chamber. Within the interior of cooker 28 is a filtering element 29, consisting of a fabric filter cover or bag 30 surrounding a filter plate 31. A recovery conduit 32 communicates with the interior of filter plate 31 and receives the filtrate that passes through the fabric cover 30. The filter element is spaced upwardly from the bottom surface of chamber 28 to as to leave a space within which steam emanating from a conduit 33 may pass into the interior of the chamber for purposes to be discussed hereinafter. Conduit 26, which emanates from the bottom portion of the chamber 10, extends into the upper portion of the cooker 28, as clearly disclosed in Fig. 2, and contains a pair of control valves 26a and 26b. Situated midway between the upper and lower extremities of the cooker 28 is a sight glass 28a which is used to observe the level of liquid or slurry within the interior of chamber 26.

An air compressor designated by reference character 34, driven by a motor 34a discharges air under pressure through a conduit 35 into the interior of chamber 28 to form chamber 28 into a compression chamber by which liquid solvent in the slurry transferred from filter chamber 10 may be removed by means of the filter element 29. Under ordinary conditions, between 5 and 20 pounds of air pressure per square inch has proved satisfactory for these purposes. When the chamber 28 is under compression, it must be sealed by closing valve 26b. A valve 32a in the outlet conduit 32 is opened to permit the filtered solvent to return to reservoir 11 through a valve 32b.

After the excess solvent has been removed by means of air pressure, as designated heretofore, the remaining muck is subjected to steam distillation. Steam is introduced into the bottom of chamber 28 through the line 33, where its pressure may be regulated by a control device 33a, and the pressure observed by a gauge 33b and a valve 33c controlling the flow of steam. A water inlet conduit 36, containing a valve 36a is used to introduce water into chamber 28.

A vapor discharge pipe 37, controlled by a valve 37a extends from an upper part of chamber 28 to a heat exchanger 38 which is disclosed as a water cooled condenser having a water inlet 38b, and an outlet 38a. The condensed vapors are collected in a gravity type seperator 39. Because the solvent is a chlorinated hydrocarbon, it will be heavier than water and will settle to the bottom of the separator, and when it reaches a predetermined level therein, the same flows off through a return line 40 to the reservoir 11. A sight glass 40a is provided in the return line 40 and is utilized to observe the return flow of solvent, and thereby provide means by which the operator may control the operation. The condensed water may flow outwardly through an upper conduit 41, best seen in Fig. 1. A drain conduit 46 extends from the base of the container 28 to a sewer and contains a control valve 46a, and is used for the disposal of the ultimate residue provided such action is lawful in the community in which the apparatus is located.

The operation of the system will now be explained. In normal operation, reservoir 11 will contain the used solvent wash coming from a dry cleaning machine, not shown. To prevent clogging the filter, some filter powder such as diatomaceous earth is added to the wash in reservoir 11 and properly mixed therein. The combined wash is pumped by pump 12 through conduit 13 and valve 13a into the upper interior of the apparatus 10, and when the latter is filled, the force of the pump drives the mixture against the cloth covers, not shown, surrounding the plates 14. The filtered solvent flows from the plates 14 through the conduit 16 and cross conduit 18, either to the dry cleaning machine through a conduit 44, controlled by a valve 44a, or it is returned to reservoir 11 through a return or by-pass line 45, containing a valve 45a, during a build-up of the filter cake on the filter leaves 14. The filter operation will continue in the manner described above and may be used for some time before the accumulated muck or press cake collected on the outer surfaces of the filter leaves 14 would impede filtration. When this layer becomes heavy enough to retard filtration, the driving member 20 is actuated and through the eccentric connection 21, the filter bed is oscillated, causing a portion of the filter cake or muck to be dropped onto the plate 23. When a sufficient amount of muck has accumulated on plate 23, or a predetermined time for a recovery operation occurs, valve 13a is closed and valve 13c is opened, and with pump 12 operating the unfiltered wash passes through the manifold 27 and the spray outlets 27a, agitating the sludge or muck on plate 23. Valves 26a and 26b are then opened, and the pressure of the liquid drives the accumulated slurry of wash and muck through conduit 26 into the recovery chamber 28. The latter is permitted to fill until the level therein approaches the sight glass 28a. Then valves 13c, 26a and 26b, and the vapor valve 37a, are closed and valves 32a and 32b open and the air compressor 34 started. As the pressure of air builds up within the container 28 the slurry is forced against filter 29, which acts to separate solvent from the residue and permit the recovered solvent to return to reservoir 11. As soon as the muck becomes relatively dry within container 28, steam is introduced through the line 33 and is maintained at a pressure of about 8 pounds. Under these conditions, the temperature of the steam will be above that of the solvent and will produce a distillation or separation of the solvent from the residue within the chamber 28. The vapors pass through the condenser 38, and the recovered solvent returns through conduit 40, where its passage may be observed through the sight glass 40a.

The distillation process is completed when no further solvent can be observed passing the sight glass 40a. Then, in order to dispose of the ultimate residue provided it is lawful to dispose of solids in the sewage system, water is admitted through conduit 36 and past valve 36a, and the steam is allowed to continue to enter through conduit 33 so as to agitate the mass of residue and again form a slurry, this time composed of the ultimate residue and the steam heated water. When the mixture is thoroughly agitated, the sewer line 46 is opened through valve 46a to dispose of the residue.

It frequently occurs in a dry cleaning operation that a detergent is used in combination with the solvent, and in that instance, it is preferable to use a double filtering system, one for the detergent carrying solvent and the other for a rinsing solvent. As disclosed in Figs. 1 and 2, a second filter element 42, similar in all respects to filter element 10, is provided for the solvent carrying detergent. The element 42 is mounted over a reservoir 42a, which is connected into the system through a conduit 26, having a control valve 26c by which the slurry may be conveyed to the recovery chamber 28, and a return conduit 32 controlled by a valve 32c by which the pressure recovered solvent may be returned to the reservoir 42a. In the steam distillation process related to the recovery of muck coming from the separator 42, the solvent so recovered is in a pure condition and would normally be returned to reservoir 11.

The principal advantage flowing from the present method and apparatus is in the provision of an efficient and practical method for removing muck from a dry cleaning filter and thereafter reclaiming substantially all of the solvent from such material without any handling of the filter muck by an operator, even including the final steps of disposing of the ultimate residue.

Another advantage resides in the fact that the entire system may be sealed from air to avoid loss by evaporation during the transfer of the muck from the filter to the solvent reclaimer, while providing a minimum of lost time for performing the operation.

Although the invention has been described in connection with the recovery of solvents used in the dry cleaning of fabrics, it will be appreciated that the invention is also applicable to other processes where solvents are used for cleaning other types of material, such as the degreasing of metals and the like, and therefore, the invention is not limited beyond the scope of the appended claims.

I claim:

1. In a process of reclaiming solvent from a cleansing wash containing solvent and impurities, embodying separating impurities from said wash in a closed vessel, and thereafter steam distilling said impurities in a separate vessel to recover the residual solvent therein; the improvement comprising the steps of forming a slurry comprising said impurities within the first vessel, transferring said slurry from said first vessel to the second vessel in a confined condition and out of contact with the atmosphere, and separating the impurities from the slurry within the second vessel prior to steam distillation of the impurities to thereby prevent evaporative loss of solvent entrained in the impurities.

2. In a process of reclaiming solvent from a cleansing wash containing solvent and impurities, embodying separating the impurities from said wash in a closed vessel, and thereafter steam distilling said impurities in a separate closed vessel; the improvement comprising the steps of forming a slurry composed of said impurities and solvent within the first vessel, pumping said slurry from the first vessel to the second vessel in a confined condition and out of contact with the atmosphere, and separating the solvent from the impurities within the second vessel prior to the steam distillation of said impurities to thereby prevent evaporative loss of solvent entrained in said impurities.

3. In a process of reclaiming solvent from a cleansing wash containing solvent and impurities, embodying filtering said wash in a closed filter vessel to separate the solvent from the impurities, and subsequently steam distilling the impurities in a separate recovery vessel, the improvement comprising the steps of forming in said filter vessel a slurry composed of unfiltered wash and the separated impurities, transferring said slurry from the filter vessel to the recovery vessel in a confined condition and out of contact with the atmosphere, and filtering the slurry within the recovery vessel to recover the liquid solvent therefrom prior to steam distillation of the impurities and thereby prevent evaporative loss of solvent entrained in the impurities.

4. In a system for recovering solvent from a cleansing wash containing solvent and muck embodying an enclosed filter chamber containing means for filtering solvent from said muck, means within said chamber for dislodging muck from said filtering means, a muck recovery chamber, the improvement comprising a wash distributor disposed within said filter chamber to form a slurry between the wash and the dislodged muck, means including a conduit connecting said filter chamber and said recovery chamber for transferring said slurry from said filter chamber to said recovery chamber, a second filtering means disposed in said recovery chamber, and pneumatic means co-acting with said recovery chamber and said second filtering means to filter solvent from said slurry within said recovery chamber.

5. In a process of reclaiming solvent from a cleansing wash containing solvent and muck, embodying filtering solvent from said wash within a first closed vessel, and thereafter distilling the residual muck in a separate closed vessel to recover the solvent therein; the improvement comprising the steps of collecting the separated muck in a relatively solid mass on a lower surface in said first vessel, forcibly directing a liquid comprising solvent into contact with the separated collected muck in said first vessel in such a manner as to suspend the muck in said liquid and form a slurry, transferring said slurry from said first vessel to said second vessel in a confined condition and out of contact with the atmosphere, filtering said slurry in said second vessel to remove a major portion of liquid solvent therefrom, and introducing steam into said second vessel beneath the mass of filtered muck therein to distill the residual portion of solvent from said muck.

6. In a process of reclaiming solvent from a cleansing wash containing solvent and muck, embodying forcing said wash through a porous surface within a closed filtering vessel to separate solvent from said wash and deposit the muck on said porous surface, dislodging the collected muck from said porous surface and depositing the same on a lower surface within said filtering vessel, admitting wash under pressure into said filtering vessel beneath the porous filtering surface therein and into direct contact with the dislodged muck to form a slurry in said filtering vessel, transferring said slurry from said filtering vessel to a second vessel in a confined condition and out of contact with the atmosphere, filtering a major portion of the solvent from said slurry within said second vessel in an area above the lower surface of said second vessel, injecting steam into said second vessel beneath the residual muck therein to distill the residual solvent therefrom, and recovering said residual solvent from the distillate.

7. In a process of reclaiming solvent from a cleansing wash containing solvent and muck, embodying filtering solvent from said wash within a first closed vessel, and thereafter distilling the residual muck in a separate closed vessel to recover the residual solvent therein; the improvement comprising the steps of forming a slurry composed of the residual muck and a liquid comprising solvent within the first vessel, transferring said slurry from said first vessel to said second vessel in a confined condition and out of contact with atmosphere, filtering the solvent from the slurry within said second vessel in an area in said second vessel above the bottom surface thereof, and injecting steam into said second vessel beneath the residual muck therein to distill the residual solvent therefrom.

8. In a process of reclaiming solvent from a cleansing wash containing solvent and gummy impurities, embodying the steps of adding a filtering powder to the cleansing wash to combine with the impurities therein and form a filterable mixture, transferring said mixture into a closed vessel containing porous filtering elements, maintaining pressure on the mixture within said closed vessel to filter solvent from said wash and lodge solids in said wash on the filtering elements within said closed chamber, dislodging said solids from the filtering elements to the wash in said vessel, to coalesce as a relatively gummy mass on the lower surface of said vessel beneath the filtering elements therein, which on settling tends to tightly adhere to the lower surface of said vessel, the improvement comprising agitating the mixture of wash and the coalescent mass within said vessel independently of the dislodgment of said solids from said filtering elements to resuspend the solids in the wash and form a slurry, transferring said slurry from said first vessel in a confined condition and out of contact with the atmosphere to a second closed vessel, and recovering the solvent from said slurry including the distillation thereof in said second vessel.

9. A method as described in claim 8, wherein the agitation of the mixture of wash and the coalescent mass to form a slurry is accomplished by forcibly flowing additional wash under pressure across the surface on which said mass is deposited.

10. In a process of reclaiming solvent from a cleansing wash containing solvent and gummy impurities, embodying the steps of adding a filtering powder to the cleansing wash to combine with the impurities therein and form a filterable mixture, transferring said mixture into a closed vessel containing porous filtering elements, maintaining pressure on the mixture within said closed vessel to filter solvent from said wash and lodge solids in said wash on the filtering elements within said closed chamber, dislodging said solids from the filtering elements to the wash in said vessel to coalesce as a relatively gummy mass on the lower surface of said vessel beneath the filtering elements therein, the improvement comprising agitating the mixture wash and the coalescent mass within said vessel independently of the dislodgment of said solids from said filtering elements to resuspend the solids in the wash and form a slurry, transferring said slurry from said first vessel in a confined condition and out of contact with the atmosphere to a second closed vessel, filtering said slurry in said second vessel to remove a major portion of liquid solvent therefrom, and introducing steam into said second vessel in contact with the residual solids therein to distill the residual portion of solvent from said solids.

11. In a system for recovering solvent from a cleansing wash containing solvent and muck, embodying an enclosed filter chamber containing means for filtering solvent from said muck, means operatively associated with said chamber for dislodging muck from said filtering means to a surface within said chamber beneath said filtering means, a muck recovery chamber; the improvement comprising means operatively associated with said filter chamber for introducing a liquid comprising solvent under pressure into contact with the dislodged muck beneath said filtering means to form a slurry within said filter chamber, liquid conducting means connecting said filter chamber and said recovery chamber for transferring said slurry from said filter chamber to said recovery chamber out of contact with the atmosphere, a second filtering means disposed in said recovery chamber above the bottom surface thereof, pneumatic means co-acting with said recovery chamber and said second filtering means to filter the solvent from said slurry within said recovery chamber, means for injecting steam into direct contact with the residual muck within said recovery chamber to distill residual solvent from said muck, and means for recovering said residual solvent from the distillate.

References Cited in the file of this patent

UNITED STATES PATENTS

| | | |
|---|---|---|
| 2,301,803 | Davis | Nov. 10, 1942 |
| 2,379,848 | Damme et al. | July 3, 1945 |
| 2,562,699 | Cooperson et al. | July 31, 1951 |
| 2,686,412 | Riciglaino et al. | Aug. 17, 1954 |
| 2,774,727 | Hobson | Dec. 18, 1956 |
| 2,828,862 | Johnson | Apr. 1, 1958 |